United States Patent
Gelberg et al.

(10) Patent No.: US 7,949,800 B2
(45) Date of Patent: May 24, 2011

(54) METHOD FOR EXCHANGING INFORMATION WITH PHYSICAL LAYER COMPONENT REGISTERS

(75) Inventors: Oren Gelberg, Natanya (IL); Motti Dvir, Kiryat Ono (IL); Yehuda Rudin, Natanya (IL)

(73) Assignee: Freescale Semiconductor, Inc., Austin, TX (US)

( * ) Notice: Subject to any disclaimer, the term of this patent is extended or adjusted under 35 U.S.C. 154(b) by 237 days.

(21) Appl. No.: 12/278,478

(22) PCT Filed: Feb. 9, 2006

(86) PCT No.: PCT/IB2006/050428
§ 371 (c)(1),
(2), (4) Date: Aug. 6, 2008

(87) PCT Pub. No.: WO2007/091128
PCT Pub. Date: Aug. 16, 2007

(65) Prior Publication Data
US 2009/0132735 A1    May 21, 2009

(51) Int. Cl.
*G06F 3/00* (2006.01)
(52) U.S. Cl. .................. 710/19; 710/36; 710/52; 710/58
(58) Field of Classification Search .................. None
See application file for complete search history.

(56) References Cited

U.S. PATENT DOCUMENTS

| | | |
|---|---|---|
| 6,154,460 A | 11/2000 | Kerns et al. |
| 6,212,593 B1 | 4/2001 | Pham et al. |
| 6,298,396 B1 | 10/2001 | Loyer et al. |
| 6,735,210 B1 | 5/2004 | Lindeborg et al. |
| 2002/0161943 A1 | 10/2002 | Kim |
| 2002/0176430 A1 | 11/2002 | Sangha et al. |
| 2004/0034718 A1 | 2/2004 | Goldenberg et al. |
| 2004/0049612 A1 | 3/2004 | Boyd et al. |
| 2004/0072573 A1 | 4/2004 | Shvodian |
| 2004/0073724 A1 | 4/2004 | Wilson et al. |
| 2005/0068956 A1 | 3/2005 | Liao et al. |
| 2005/0093885 A1 | 5/2005 | Savekar et al. |
| 2005/0243816 A1 | 11/2005 | Wrenn et al. |

FOREIGN PATENT DOCUMENTS

| | | |
|---|---|---|
| EP | 0991230 A2 | 4/2000 |
| WO | 0117166 A2 | 3/2001 |

*Primary Examiner* — Alan Chen

(57) ABSTRACT

A device and a method for exchanging information with registers of a physical layer component. The method includes allocating at least one receive buffer for receiving the status information; associating at least one receive buffer descriptor with the at least one receive buffer; sending to a physical layer component a request to read status information stored in a selected status register of the physical layer component; and writing the status information to the at least one receive buffer descriptor.

20 Claims, 10 Drawing Sheets

| Reserved 11 | Speed selection (LSB) 12 | Collision test enable 13 | Duplex mode 14 | Restart auto-negotiation 15 | Isolate 16 | Power down 17 | Auto-negotiate enable 18 | Speed selection (MSB) 19 | loopback 20 | Reset 21 |

Control register 10

PRIOR ART

FIG. 1

| Extended capabilities 31 | Jabber detect 32 | Link status 33 | Auto-negotiate ability 34 | Remote fault 35 | Auto-negotiate complete 36 | MF preamble suppression 37 | Reserved 38 | Extended sattus 39 |
|---|---|---|---|---|---|---|---|---|
| 100BASE-T2 half duplex 40 | 100BASE-T2 full duplex 41 | 10 Mb/s half duplex 42 | 10 Mb/s full duplex 43 | 100BASE-X half duplex 44 | 100BASE-X full duplex 45 | 100BASE-T4 45 | | |

Status register 30

| 1000BASE-T half duplex 51 | 1000BASE-T full duplex 52 | 1000BASE-X half duplex 53 | 1000BASE-X full duplex 54 |
|---|---|---|---|

Extended status register 50

FIG. 2

PRIOR ART

100

US 7,949,800 B2

METHOD FOR EXCHANGING INFORMATION WITH PHYSICAL LAYER COMPONENT REGISTERS

FIELD OF THE INVENTION

The invention relates to a method for exchanging information with physical layer component registers and especially with status and control registers of physical layer component and a device having control and status information exchanging capabilities.

BACKGROUND OF THE INVENTION

In today's communications, digital networks transport large amounts of information. Network services can be, for example, traditional voice phone, facsimile, television, audio and video broadcast, and data transfer.

Buffers and buffer descriptors are used to convey data. Buffers store data to be transmitted or received while buffer descriptors point to these buffers. Various examples of data transmission devices and methods using buffer descriptors are illustrated in the following U.S. patents and patent applications, all being incorporated herein by reference: U.S. Pat. No. 6,212,593 of Pham et al., U.S. Pat. No. 6,735,210 of Lindeborg et al., U.S. Pat. No. 6,154,460 of Kerns et al., U.S. Pat. No. 6,298,396 of Loyer et al., U.S. patent application 2004/0073724 of Wilson et al., U.S. patent application 2002/0176430 of Sangha et al., U.S. patent application 2005/0243816 of Wrenn et al., U.S. patent application 2005/0093885 of Savekar et al., U.S. patent application 2005/0068956 of Liao et al., and U.S. patent application 2002/0161943 of Kim.

Various communication protocols as well as various management protocols were developed in order to support a variety of services and configurations.

The IEEE defined two management interface named MII management and GMII management that use a two-wire serial interface to connect between a management entity and managed physical layer (PHY) components. GMII can support faster communication protocols than the MII. An exemplary device that includes such a serial interface is described in PCT patent application publication serial number WO 01/17166 of Kalapatapu which is incorporated herein by reference.

Each PHY component has multiple registers that can be accessed by using the MII management or GMII management interface. These registers can be accessed in order to control the PHY components and gathering status from the PHY components.

The management interface includes a pair of signals (clock and information signals), a management frame, a set of registers that can be read and written using the management frames, and a protocol specification that defines the manner in which the management frame is transferred between the management entity and the PHY components. The basic (mandatory) set of registers of the MII management includes a control register and a status register. The MII management and the GMII management use the same management frames and use the same signals. The GMII management includes an additional basic register that is referred to as extended status register.

The control register is known as register 0. The status register is known as register 1. The extended status register is known as register 15. Registers 2-10 belong to an extended register set. This extended register set includes PHY identifier registers (registers 2 and 3), auto-negotiation advertisement register (register 4), auto-negotiation link partner base page ability register (register 5), auto-negotiation expansion register (register 6), auto-negotiation next page transmit register (register 7), auto-negotiation link partner received next page register (register 8), MASTER-SLAVE control register (register 9) and MASTER-SLAVE status register (register 10).

FIG. 1 and FIG. 2 illustrates the content of control register 10, status register 30 and the extended status register 50.

Control register 10 includes the following fields: reserved (not used) field 11, speed selection fields (LSB and MSB) 12 and 19, collision test enable field 13, duplex mode field 14, restart auto-negotiation field 15, isolate field 16, power down field 17, auto-negotiate enable field 18, loopback field 20 and reset field 21. These fields control the manner in which the PHY component operates.

Status register 30 includes the following fields: extended capabilities field 31, jabber detect field 32, link status field 33, auto-negotiation ability field 34, remote fault field 35, auto-negotiation complete field 36, MF preamble suppression field 37, reserved (not used) field 38, extended status field 39, 100BASE-T2 half duplex field 40, 100BASE-T2 full duplex field 41, 10 Mb/s half duplex field 42, 10 Mb/s full duplex field 43, 100BASE-X half duplex field 44 and 100BASE-T4 field 45.

Extended status register 50 includes the following fields: 1000BASE-T half duplex field 51, 1000BASE-T full duplex field 52, 1000BASE-X half duplex field 53 and 1000BASE-X full duplex field 54. It also includes reserved bits (not shown).

Fields 31-54 indicate the status of the PHY component. For example, they indicate the communication protocols it supports and the state of an auto-negotiation session conducted with that PHY component.

A single communication controller may be required to write control information to physical layer component control registers and also to read status information from physical layer component status registers. One method for doing it involved polling the status register and control registers and determining whether data can be transferred, as well as using dedicated registers within a register file to save parts of the status information or control information. Registers are more expensive than simple memory unit entries. Accordingly, using registers was resource consuming.

The polling method required a lot of processor intervention in order to know when the access is done so valid data can be read.

FIG. 3 illustrates a management frame 80. Management frame 8C is serially transferred over a first line while a second line is used to convey a clock signal. Multiple physical layer components are connected in parallel to the information line and to the clock line.

The management frame 80 starts by a preamble field 81 (can be thirty two bits long) that is followed by a two bit long start of frame indication 82 (value of '01'), a two bit long opcode 83 that indicate if the frame is being transferred during a read operation (from the register of the physical layer component to the management entity) or a write operation, a five bit long physical layer component address 84, a five bit long register address 85, a two bit long turnaround field 86, and a two-byte long data field 87.

The complexity of status information and control information management increases as the number of physical layer registers increase.

There is a need to provide an efficient method and device for reading status information from status registers of physical layer components.

SUMMARY OF THE PRESENT INVENTION

A method for exchanging information with physical layer component registers and a device having control and status information exchanging capabilities, as described in the accompanying claims.

BRIEF DESCRIPTION OF THE DRAWINGS

The present invention will be understood and appreciated more fully from the following detailed description taken in conjunction with the drawings in which:

FIG. 1 illustrates a prior art control register;

FIG. 2 illustrates a prior art status register and a prior art extended status register;

DETAILED DESCRIPTION OF THE DRAWINGS

Embodiments of the present invention illustrated in the accompanying drawings provide a method. The method includes: allocating at least one receive buffer for receiving the status information; associating at least one receive buffer descriptor with the at least one receive buffer; sending to a physical layer component a request to read status information stored in a selected status register of the physical layer component; and writing the status information to the at least one receive buffer descriptor.

Embodiments of the present invention illustrated in the accompanying drawings provide a device. The device includes a serial peripheral interface that is adapted to send to a physical layer component a request to read status information stored in a selected status register of the physical layer component. The device is also adapted to: allocate at least one receive buffer for receiving the status information; associate at least one receive buffer descriptor with the at least one receive buffer; write the status information to the at least one receive buffer descriptor.

Figure 3:
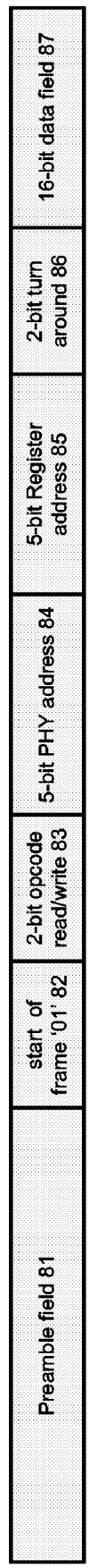
FIG. 3 illustrates a prior art management frame.
Figure 4:
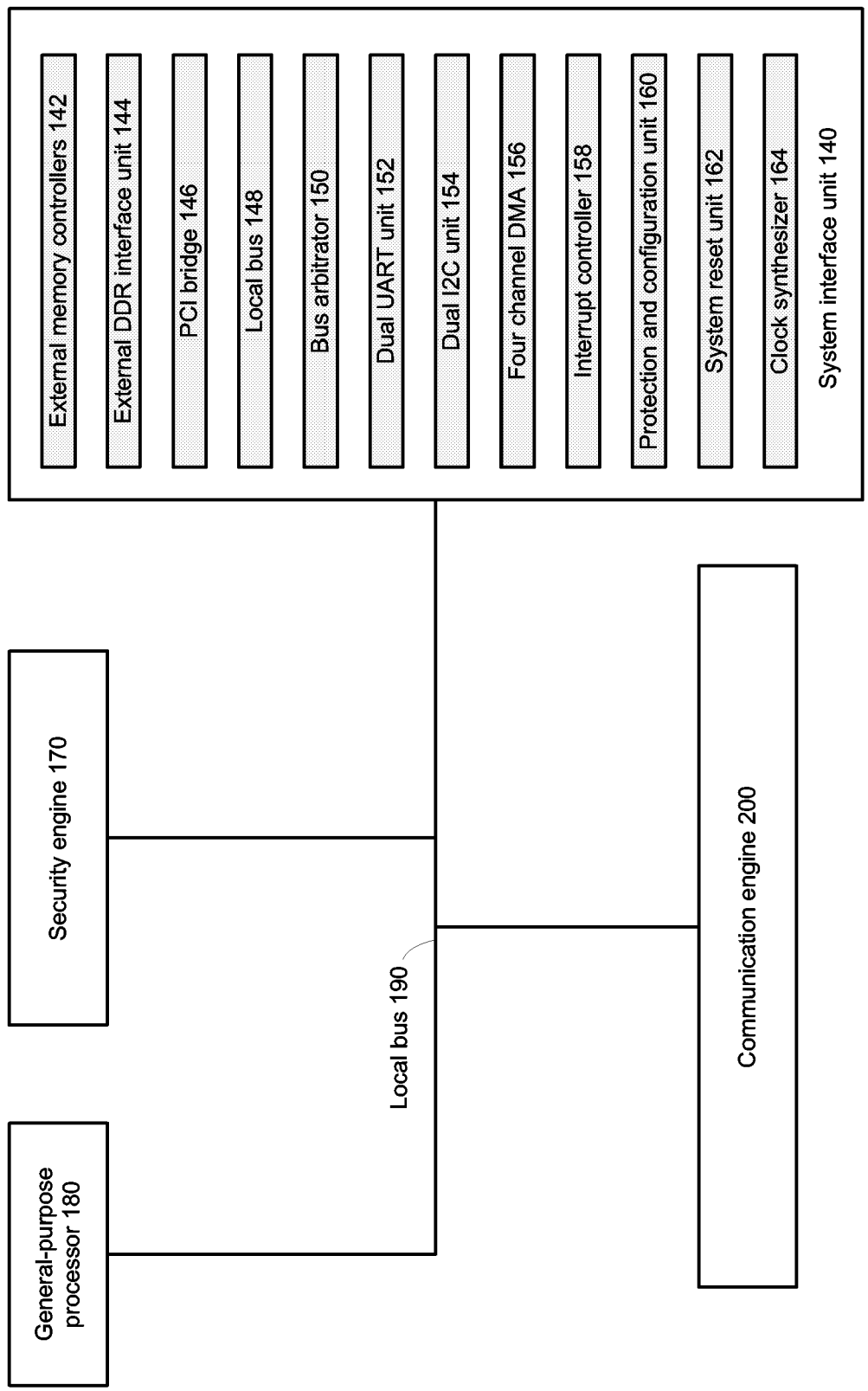
FIG. 4 illustrates a communication device according to an embodiment of the invention.

FIG. 4 illustrates a communication device 100, according to an embodiment of the invention.

Communication device 100 includes a first processor, such as general-purpose processor 180, a security engine 170, system interface unit 140, communication engine 200 and multiple ports (not shown). Components 180, 170, 140 and 200 are connected to each other by central bus 190.

The general-purpose processor 180 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 180 controls the communication device 100 and can execute various programs according to the required functionality of communication device 100. The general-purpose processor 180 can be a member of the PowerPC™ family but this is not necessarily so.

The security engine 170 can apply various security mechanisms including encryption based mechanisms and the like.

Communication device 100 can be connected to multiple memory units as well as other components. These components are interfaced by system interface unit 140. System interface unit 140 may include some of the following components: external memory controllers 142, external DDR interface unit 144, PCI bridge 146, local bus 148, bus arbitrator 150, Dual UART unit 152, dual 12C unit 154, a four channel DMA 156, interrupt controller 158, protection and configuration unit 160, system reset unit 162 and clock synthesizer 164. It is noted that other interfacing components can be used.

Figure 5:
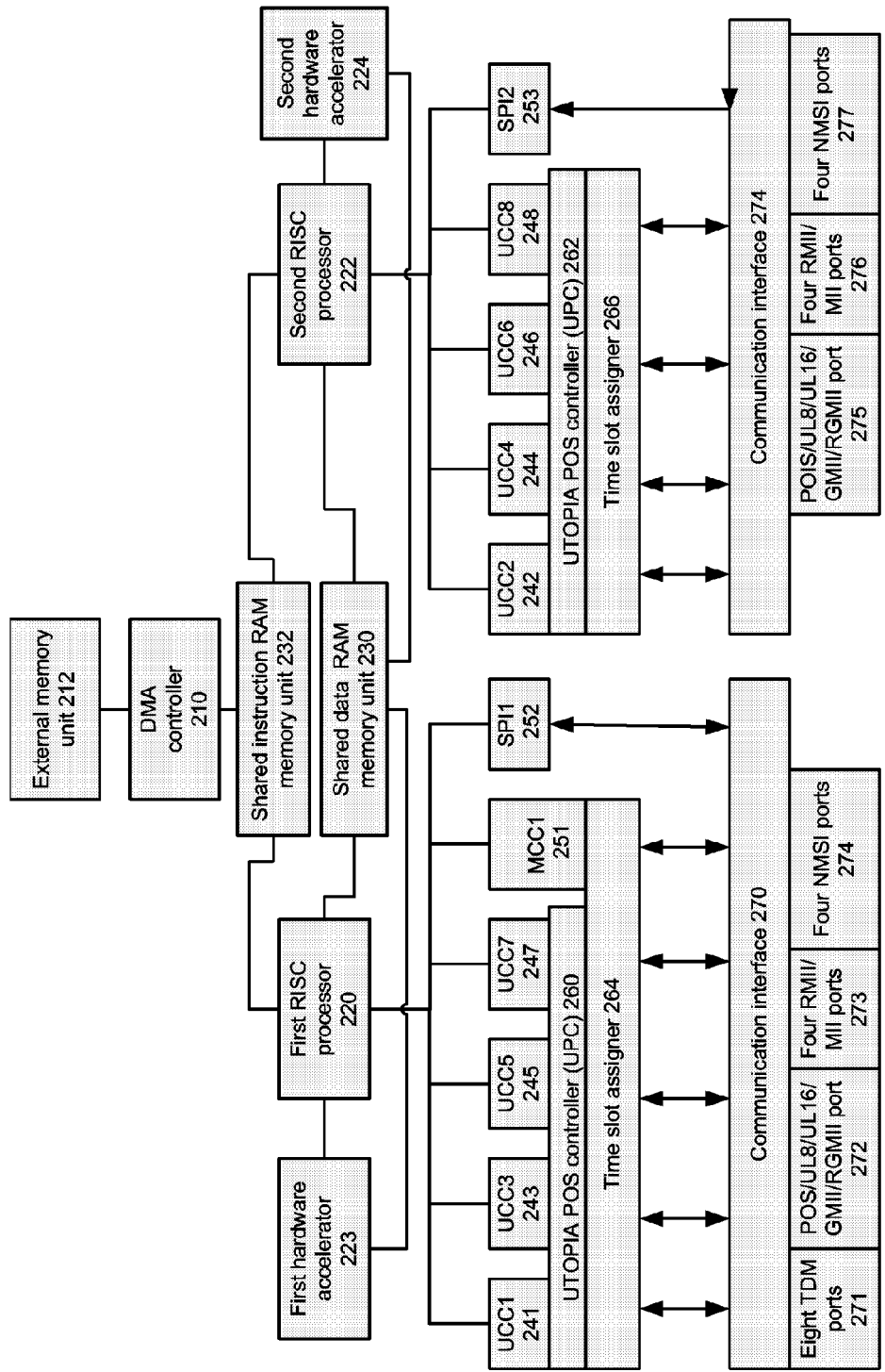
FIG. 5 illustrates a communication engine according to an embodiment of the invention.

FIG. 5 illustrates a communication engine 200, according to an embodiment of the invention.

It is noted that FIG. 5 illustrates an embodiment of the invention and that other communication engines (including those who have a single processor or more that two processors) can be used.

The communication engine 200 is a versatile communication component that can manage multiple communication ports that operate according to different communication protocols. It includes two RISC processors 220 and 222 that can work substantially independently from each other.

The communication engine 200 includes two RISC processors 220 and 222, DMA controller 210, a shared data RAM memory unit 230, a shared instruction RAM memory unit 232, eight universal communication controllers denoted UCC1-UCC8 241-248, one multi-channel communication controller (MCC) 251, two serial peripheral interfaces denoted SPI1-SPI2 252-253, two UTOPIA POS controllers 261 and 262, two time slot assigners 264 and 266 and two communication interfaces 270 and 274. Time slot assigner 264 assigns time slots for accessing communication interface 270. Time slot assigner 266 assigns time slots for accessing communication interface 274.

Each of the serial peripheral interfaces is adapted to manage transmissions and receptions of data, status information and control information between the communication engine 200 and other components (such as PHY components) using serial communication protocols.

The first communication interface 270 is connected to multiple time division multiplex (TDM) ports that are collectively denoted 271, a UTOPIA-packet over SONET (POS) port 272, as well as four RMII ports collectively denoted 273, and four NMSI ports collectively denoted 274.

The second communication interface 274 is connected to another UTOPIA-packet over SONET (POS) port 275, four RMII ports collectively denoted 276, and four NMSI ports collectively denoted 274. It is noted that other communication protocols can be supported by communication device 100.

Each RISC processor out of 220 and 222 can access the shared data RAM memory unit 230 and the shared instruction RAM memory unit 232. RISC processor 220 can control half of the multiple communication controllers and ports. For example, RISC processor 220 can control UCC1-UCC4 241-244, MCC 251 and SPI1 252. It can also communicate with UTPOIA POS controller 260 and time slot assigner 264.

Conveniently, a UCC can support the following communication protocols and interfaces (not all simultaneously):

10/100 Mbps Ethernet, 1000 Mpbs Ethernet, ATM protocol via UTOPIA interface, various types of HDLC, UART, and BISYNC.

Conveniently, MCC 251 supports two hundred and fifty six HDLC or transparent channels, one hundred and twenty eight SS#7 channels or multiple channels that can be multiplexed to one or more TDM interfaces.

In addition, the communication engine 200 can include a controller (not shown) as well as an interrupt unit that coordinates the various components of the communication engine, as well as to enable the communication engine 200 to communicate with general-purpose processor 110, security engine 62 and system interface unit 140.

The first RISC processor 220 is connected to a first hardware accelerator 223. The first hardware accelerator 223 can access the shared data RAM memory unit 230. The second RISC processor 222 is connected to a second hardware accelerator 224.

The DMA controller 210 is connected to an external memory unit 212.

Figure 6:
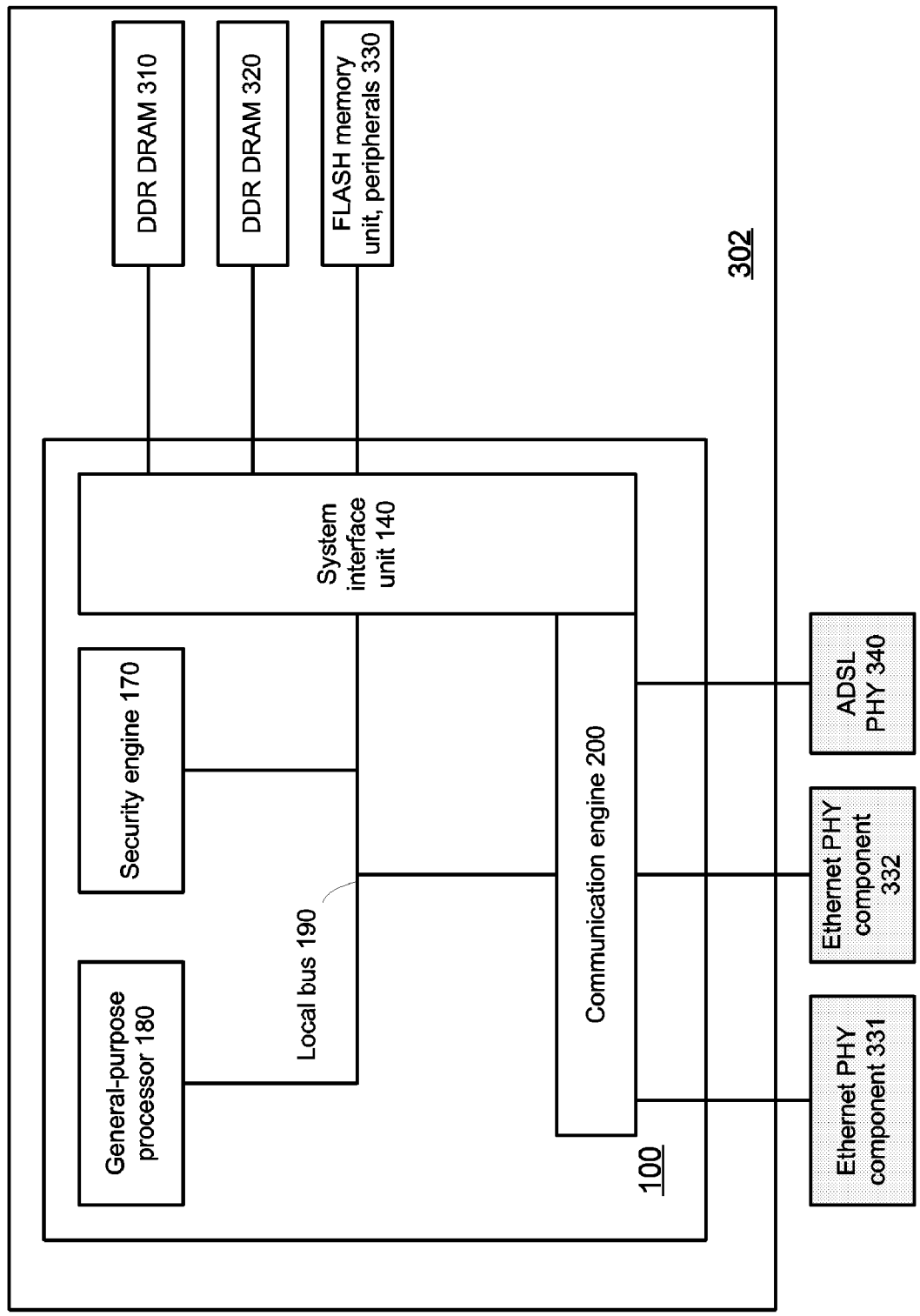
FIG. 6 illustrates an exemplary configuration of the communication device, and its environment according to an embodiment of the invention.

FIG. 6 illustrates an exemplary configuration of communication device 100, and its environment, according to an embodiment of the invention.

Communication device 100 is illustrated as supporting a data path of a DSL line card 302. This DSL card 302, as well as many other DSL line cards can belong to a DSLAM.

Line card 302 also includes two DDR DRAM units 310 and 310, as well as a flash memory unit 330, all being connected to communication device 100 via the system interface unit 140.

The communication engine 200 is configured as an xDSL line card and is connected to multiple Ethernet PHY components 330 and 332, as well as to an ADSL PHY component 340. The communication device 100 supports ATM multi-PHY subscriber lines and an Ethernet uplink.

Figure 7:
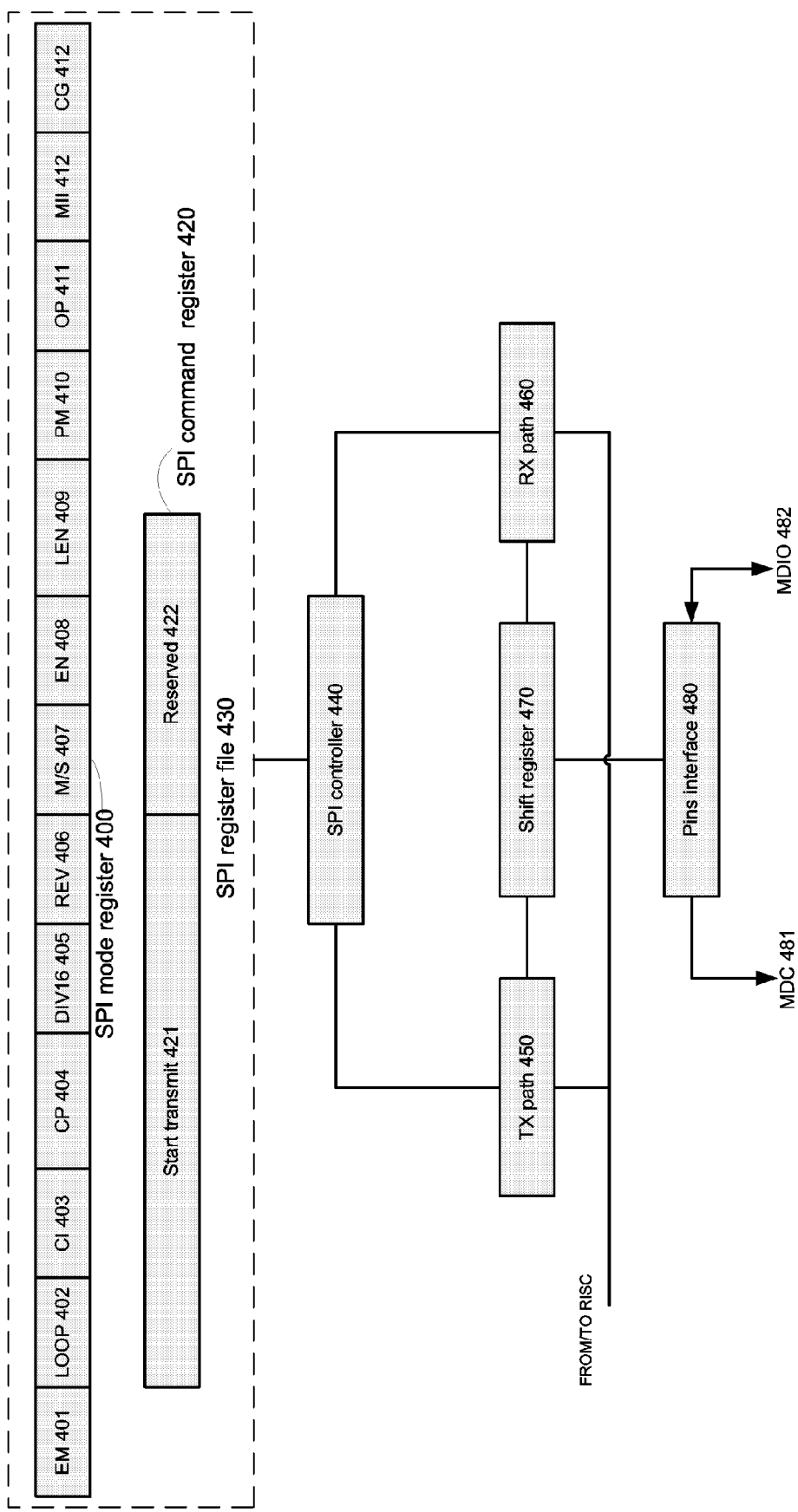
FIG. 7 illustrates two serial peripheral interface registers according to an embodiment of the invention.

FIG. 7 illustrates a serial peripheral interface (SPI1) 252, according to an embodiment of the invention. It is assumed that SPI2 is equivalent to SPI1 and that each serial peripheral interface operated independently.

SPI1 252 includes an SPI register file 430, a SPI controller 440, a transmit path (TX path) 450, a reception path (RX path) 460, a shift register 470 and a pins interface 480. It can access a parameter data structure 540.

The SPI controller 440 executes commands and can perform various read and write operations, and especially capable of transmitting and receiving data, control information and status information over serial lines such as MDC 482 and MDIO 482.

MDC 482 is a serial clock output signal. MDIO 482 is serial data line.

The SPI controller 440 is connected to the SPI register file 430, to TX path 450 and to RX path 460. The shift register 470 is used to perform serial to parallel conversions and parallel to serial conversions. It is controlled by the SPI controller 440. The shift register 470 is connected to the TX path 450, to the RX path 460 and to the pins interface 480.

The TX path 450 and the RX path 460 can receive or transmit information from/to the multiple bit bus that is connected to first RISC processor 220. They can also send/get data to/from the shift register that in turn sends/gets the data in a serial manner via pins interface 480.

Conveniently, the SPI register file 430 is accessed by general purpose processor 180. It includes various registers such as SPI command register 420 and SPI mode register 400. The SPI command register 430 includes reserved bits 422 and a start transmit instruction field 412.

The SPI mode register 400 includes the following fields: (i) Emergency request (EM) field 401 that is used to indicate that an emergency request should be sent to RISC 230, (ii) LOOP field 402 that indicates if the SPI operates normally or whether the RX path and the TX path form a closed loop; (iii) Clock invert (CI) field 403 indicating what is the inactive state of MDC, (iv) Clock phase (CP) field 404 indicating whether the serial clock signals starts to toggle at the beginning or during the middle of the data transfer, (v) DIV16 field 405 indicating the baud rate of the clock signal, (vi) data order (REV) field 406 indicating whether the least significant bit or the most significant bits of data are received or transmitted first, (vi) Master/slave (M/S) field 407 that indicates if the SPI operates in slave more or in master (or MII) mode, (vii) Enable (EN) field 408 that indicates if the SPI is enabled, (viii) character length (LEN) field 409, (ix) clock pre-scale division (PM) field 410, (x) Operational mode (OP) field 411 indicating if the SPI1 is controlled by the general purpose processor 180 or the first RISC processor 230, (xi) MII mode (MII) field 412 indicating if the SPI operates in MII mode or in normal (data) SPI mode, and (xii) Clock gap (CG) field 412 indicating the gap between two consecutive characters.

Figure 8:
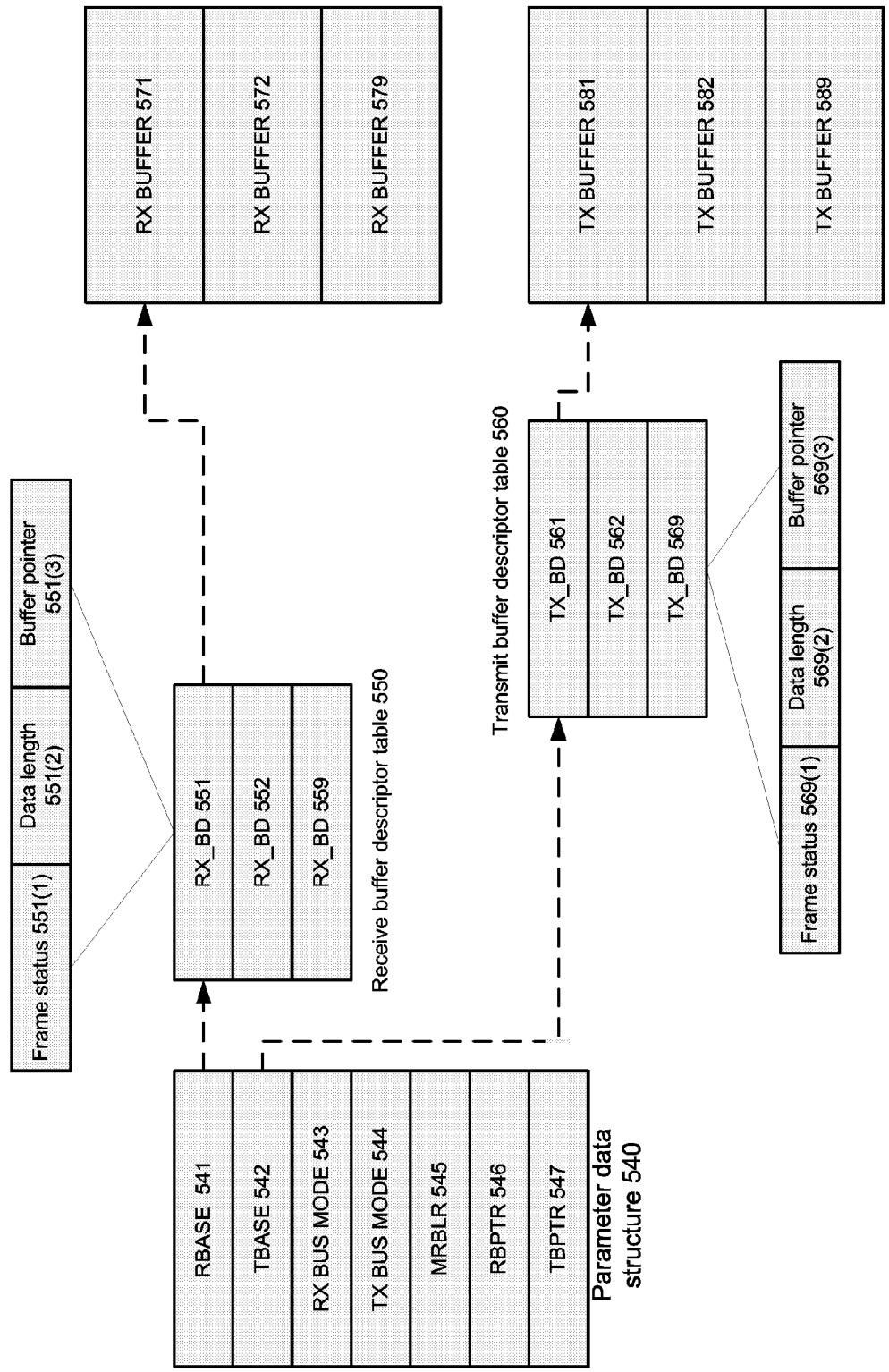
FIG. 8 illustrates exemplary data structures according to an embodiment of the invention.

FIG. 8 illustrates various data structures 540-589, according to an embodiment of the invention.

The various data structures illustrated in FIG. 8 includes parameter data structure 540 (stored in shared data RAM memory unit 230), a receive buffer descriptor table 550, a transmit buffer descriptor table 560, multiple transmit buffers (collectively denoted 580) and multiple receive buffers (collectively denoted 570).

Transmit buffers such as TX BUFFERs 581-589 can store data or control information. At least one transmit buffer can be located in external memory units such as external memory unit 212 while at least one other transmit buffer can be located in an internal memory unit such as shared data RAM memory unit 230.

Receive buffers such as RX BUFFERs 571-579 can store data or status information. At least one receive buffer can be located in external memory units such as external memory unit 212 while at least one other receive buffer can be located in an internal memory unit such as shared data RAM memory unit 230.

Each receive buffer is associated with a receive buffer descriptor. RX BUFFERs 571-579 are associated with RX_BDs 551-559. Each transmit buffer is associated with a transmit buffer descriptor. TX BUFFERs 581-589 are associated with TX_BDs 561-569.

Each receive buffer descriptor includes a frame status field, a data length field and a buffer pointer. For example, RX_BD 551 includes a frame status field 551(1), data length field 551(2) and buffer pointer field 551(3). Frame status field 551(1) indicates whether the buffer is full, is BD_RX 551 the last buffer descriptor of table 550, whether to generate an interrupt in response to the state of the buffer, whether the buffer contains the last character of a message, if the buffer had overrun and the like. Data length field 551(2) indicates the length of received data. Buffer pointer field 551(3) stores a pointer to RX BUFFER 571.

Each transmit buffer descriptor includes a frame status field, a data length field and a buffer pointer. For example, TX_BD 569 includes a frame status field 569(1), data length field 569(2) and buffer pointer field 569(3). Frame status field 569(1) indicates whether the buffer is ready for transmitting, if TX_BD 569 the last buffer descriptor of table 560, whether to generate an interrupt in response to the state of the buffer, whether the buffer contains the last character of a message, if the buffer had underrun and the like. Data length field 569(2)

indicates the length of data to be transmitted from the buffer. Buffer pointer field 569(3) stores a pointer to TX BUFFER 589.

The parameter data structure 540 includes multiple entries such as RBASE 441, TBASE 442, RX BUS MODE 443, TX BUS MODE 444, MRBLR 445, RBPTR 446 and TBPTR 447.

RBASE 441 is the base address of receive buffer descriptor table 550. TBASE 442 is the base address of transmit buffer descriptor table 560. RX BUS MODE 443 and TX BUS MODE 444 are bus mode register that store transition specifications associated with DMA accesses to external memories such as memory unit 212. These accesses are conveniently made via the bus that is also connected to the first RISC processor 230.

MRBLR 445 is the maximal receive buffer length. This value does not affect the length of the transmit registers. RBPTR 446 points to the current receive buffer descriptor (from table 550) that is being used or to the next receive buffer descriptor to be serviced when the SPI is idle. Its value can be initialized to RBASE (or indicate zero offset from RBASE). It can be an offset from RBASE.

TBPTR 447 points to the current transmit buffer descriptor (from table 560) that is being used or to the next transmit buffer descriptor to be serviced when the SPI is idle. Its value can be initialized to TBASE (or indicate zero offset from TBASE). It can be an offset from TBASE.

Up to thirty-two PHY components can be connected in parallel to MDC 481 and MDIO 482. Each PHY component can include up to thirty-two registers. Thus, five bits are required to select between the PHY components and five bits are required to select between the registers of the selected PHY component.

The following example will further illustrate the various stages that are executed when device 100 wishes to read status information from a certain status register of a certain PHY register. It is assumed that the status register is register 1, that the PHY component is the third PHY component connected to device 100, that RX BUFFER 571, RX_BD 551, TX BUFFER 581 and TX_BD 561 participate in the reception process, that the address of RX BUFFER 571 is 0x000_1000, that the address of TX_BUFFER 581 is 0x0000_2008, and that two status bytes are read from the status register of the third PHY component.

When device 100 wishes to read the content of a certain status register of a certain PHY component that is connected to SPI1 252 it performs the following stages: (a) Configure pins interface 480 to enable MDC 481 and MDIO 482. (b) Write TBASE and RBASE to the parameter data structure 540. (c) Configure the bus mode registers, RX BUS MODE 443 and TX BUS MODE 444. (d) Set MRBLR 445 to four bytes (size of MII management frame). (e) Initialize the frame status field 555(1), data length field 551(2) and set buffer pointer field 551 to point to 0x000_1000. (f) Initialize the frame status field, data length field and set buffer pointer field of TX_BD 561. The buffer pointer field points to 0x000_2008. (g) Write fields 81-85 of frame 80 to TX BUFFER 581. The preamble field 81 is thirty bits long. The value of fields 82-85 can be: 01 (start of frame 82), 11 (read operation, two-bit long opcode field 83), 00011 (third PHY component, five bit PHY address field 85), 00001 (register 1, five bit register address field 85), and eighteen bits that are irrelevant (don't care) in fields 86 and 87. (h) writing a predefined value to SPI mode register 400 such as to indicate that SPI1 252 operates in a MII mode, operates as a master, sets the clock rate. (i) writing a start transmit command to SPI command register 420.

It is noted that some of the mentioned above stages are optional.

When these stages are executed the SPI will transmit the first portion of frame 80 to the physical layer devices, wait after the TA period expired and then receive the status information from register 1 of the third PHY component and store it at RX BUFFER 571. The relevant status information includes the last two bytes. TX buffer 581 is used to transmit the request to receive the status information.

The timing of the status read operation can be easily controlled by writing the appropriate instructions to the SPI at the required timing.

Figure 9:
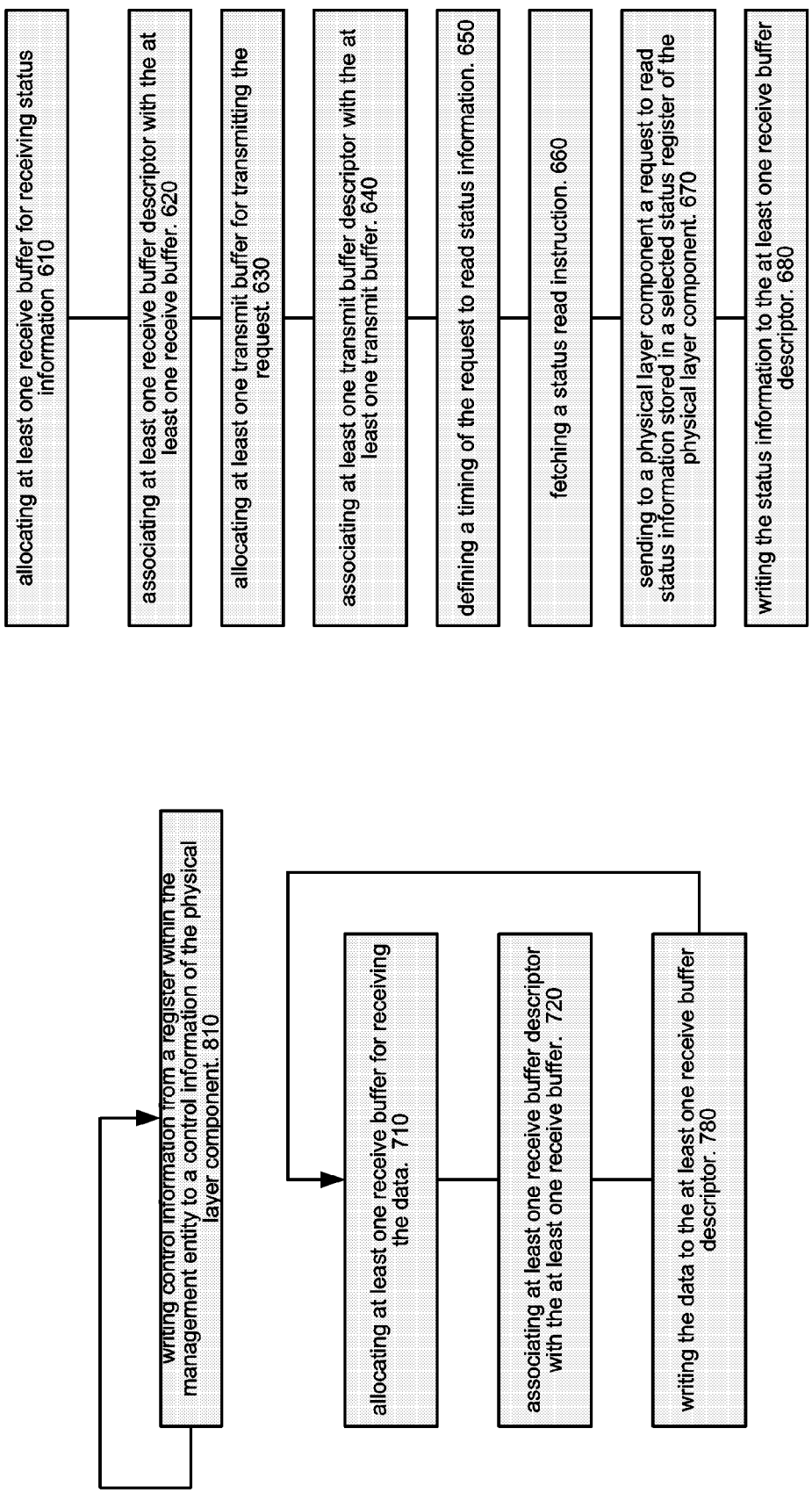
FIG. 9 is a flow chart of a method according to an embodiment of the invention.

FIG. 9 illustrates method 600 according to an embodiment of the invention.

Method 600 starts by stage 610 of allocating at least one receive buffer for receiving the status information. Referring to the example set forth in previous drawings, the number of allocated receive buffers is responsive to the length of the received buffer and to the length of data that is supposed to be received. Typically, the buffers are implemented in a memory units, thus they can be larger and even much larger than two bytes.

Stage 610 is followed by stage 620 of associating at least one receive buffer descriptor with the at least one receive buffer. This conveniently includes setting a pointer from a buffer descriptor to a corresponding buffer. Typically, each buffer is associated with a single buffer descriptor.

Stage 620 is followed by stage 630 of allocating at least one transmit buffer for transmitting the request. Referring to the example set forth in previous drawings the SPI transmits the beginning of the transmission frame, thus the beginning of the frame can be stored in a transmit buffer.

Stage 630 is followed by stage 640 of associating at least one transmit buffer descriptor with the at least one transmit buffer. This conveniently includes setting a pointer from a buffer descriptor to a corresponding buffer.

Stage 640 is followed by stage 650 of defining a timing of the request to read status information. The definition can be responsive to events, to a predefined status checking policy, and the like. By including status read instructions that initiate the reading of status from the status registers within a code that is executed by either one of the RISC processors 230 and 232, the general purpose processor 180, or even the SPI 252 the timing of the read instruction can be easily defined.

Stage 650 is followed by stage 660 of fetching a status read instruction. The fetching is part of the execution of the previously mentioned code.

Stage 660 is followed by stage 670 of sending to a physical layer component a request to read status information stored in a selected status register of the physical layer component. The request can be included within the beginning of a frame.

Stage 670 is followed by stage 680 of writing the status information to the at least one receive buffer descriptor.

Method 600 can also includes stage 710 of allocating at least one receive buffer for receiving the data. Stage 710 is followed by stage 720 of associating at least one receive buffer descriptor with the at least one receive buffer. Stage 720 is followed by stage 780 of writing the data to the at least one receive buffer descriptor.

Conveniently, method 600 further includes stage 810 of writing control information from a register within the management entity to control information of the physical layer component.

It is noted that stages 710-780 as well as stage 810 can be executed before or after stages 610-680.

Figure 10:
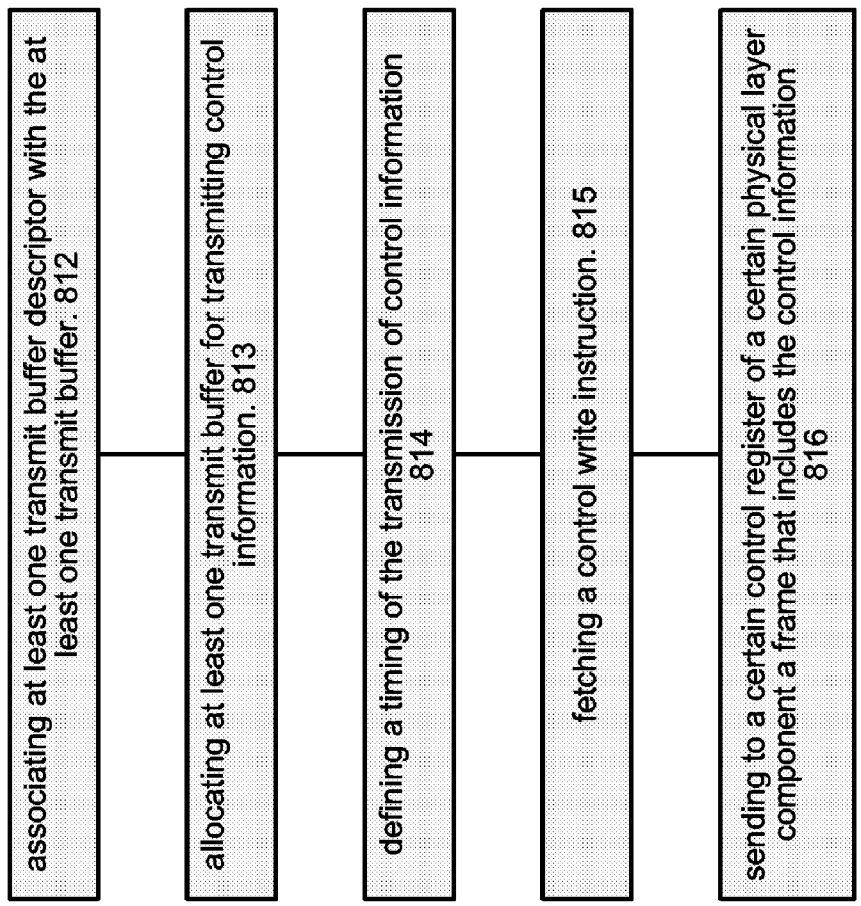
FIG. 10 is a flow chart of a method according to an embodiment of the invention.

FIG. 10 is a flow chart of method 810, according to an embodiment of the invention.

Method 810 can be executed as a part of method 600 or can be executed independently from method 600.

Method 810 starts by stage 812 of associating at least one transmit buffer descriptor with the at least one transmit buffer. This conveniently includes setting a pointer from a buffer descriptor to a corresponding buffer. Typically, each buffer is associated with a single buffer descriptor.

Stage 812 is followed by stage 813 of allocating at least one transmit buffer for transmitting control information. Referring to the example set forth in previous drawings, the number of allocated transmit buffers is responsive to the length of the transmit buffer and to the length of control data that is going to be transmitted. Typically, the buffers are implemented in a memory units, thus they can be larger and even much larger than two bytes.

Stage 813 is followed by stage 814 of defining a timing of the transmission of control information. The definition can be responsive to events, to a predefined status checking policy, and the like.

Stage 814 is followed by stage 815 of fetching a control write instruction. The fetching is part of the execution of the previously mentioned code.

Stage 815 is followed by stage 816 of sending to a certain control register of a certain physical layer component control information, using the at least one transmit buffer.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method that comprises:
   sending to a physical layer component a request to read status information stored in a selected status register of the physical layer component;
   allocating at least one receive buffer for receiving the status information;
   associating at least one receive buffer descriptor with the at least one receive buffer; and
   writing the status information to the at least one receive buffer.

2. The method according to claim 1 further comprising:
   allocating at least one transmit buffer for transmitting the request;
   associating at least one transmit buffer descriptor with the at least one transmit buffer;
   wherein the sending comprises retrieving the request from the at least one transmit buffer.

3. The method according to claim 1 further comprising fetching a status read instruction and in response sending to the physical layer component the request.

4. The method according to claim 3 wherein the fetching is preceded by defining a timing of the request to read status information and fetching the status read instruction in response to the timing.

5. The method according to claim 1 further comprising allocating at least one receive buffer for receiving the data, associating at least one receive buffer descriptor with the at least one receive buffer; writing the data to the at least one receive buffer.

6. The method according to claim 1 wherein the status information is IEEE 802.3 compliant.

7. The method according to claim 1 further comprising writing control information to a control register of a physical layer component.

8. The method according to claim 1 further comprising associating at least one buffer descriptor with at least one transmit buffer that stores control information.

9. The method according to claim 1 further comprising sending to a certain control register of a certain physical layer component control information from a transmit buffer associated with a transmit buffer descriptor.

10. A device comprising:
    a serial peripheral interface adapted to send to a physical layer component a request to read status information stored in a selected status register of the physical layer component:
    wherein the device is adapted to allocate at least one receive buffer for receiving the status information, associate at least one receive buffer descriptor with the at least one receive buffer, and write the status information to the at least one receive buffer.

11. The device according to claim 10 wherein the device is further adapted to allocate at least one transmit buffer for transmitting the request; and associate at least one transmit buffer descriptor with the at least one transmit buffer, wherein the serial peripheral interface is adapted to retrieve the request from the at least one transmit buffer.

12. The device according to claim 10 further adapted to fetch a status read instruction and in response send to the physical layer component the request.

13. The device according to claim 12 wherein the device is further adapted fetch the status read instruction at a predefined time.

14. The device according to claim 10 further adapted to allocate at least one receive buffer for receiving the data, associate at least one receive buffer descriptor with the at least one receive buffer, and write the data to the at least one receive buffer.

15. The device according to claim 10 wherein the status information is IEEE 802.3 compliant.

16. The device according to claim 10 further adapted to write control information from a register within the serial peripheral interface to a control register of the physical layer component.

17. The device according to claim 10 further comprising multiple transmit buffers and wherein the device is adapted to transmit control information to a certain control register of a certain physical layer component, from a buffer associated with a buffer descriptor of the physical layer component.

18. The method according to claim 2, further comprising fetching a status read instruction and in response sending to the physical layer component the request.

19. The method according to claim 2, further comprising allocating at least one receive buffer for receiving the data, associating at least one receive buffer descriptor with the at least one receive buffer; writing the data to the at least one receive buffer.

20. The method according to claim 2, further comprising writing control information to a control register of a physical layer component.

* * * * *